United States Patent
Nakamoto

(10) Patent No.: US 10,422,065 B2
(45) Date of Patent: *Sep. 24, 2019

(54) DRUM WASHING MACHINE

(71) Applicants: HAIER ASIA CO., LTD., Tokyo (JP); QINGDAO HAIER WASHING MACHINE CO., LTD., Shandong (CN)

(72) Inventor: Shigeharu Nakamoto, Shando (CN)

(73) Assignees: Haier Asia Co., Ltd. (JP); Qingdao Haier Washing Machine Co., Ltd. (CN)

( * ) Notice: Subject to any disclaimer, the term of this patent is extended or adjusted under 35 U.S.C. 154(b) by 170 days.

This patent is subject to a terminal disclaimer.

(21) Appl. No.: 15/506,608

(22) PCT Filed: Aug. 28, 2015

(86) PCT No.: PCT/CN2015/088440
§ 371 (c)(1),
(2) Date: Aug. 7, 2017

(87) PCT Pub. No.: WO2016/029882
PCT Pub. Date: Mar. 3, 2016

(65) Prior Publication Data
US 2017/0342623 A1   Nov. 30, 2017

(30) Foreign Application Priority Data
Aug. 29, 2014   (JP) .................................. 2014-176183

(51) Int. Cl.
*D06F 33/02* (2006.01)
*D06F 23/06* (2006.01)
(Continued)

(52) U.S. Cl.
CPC .............. *D06F 33/02* (2013.01); *D06F 13/02* (2013.01); *D06F 23/06* (2013.01); *D06F 37/304* (2013.01);
(Continued)

(58) Field of Classification Search
CPC .......... D06F 23/02; D06F 23/06; D06F 33/02; D06F 37/30; D06F 37/36; D06F 39/002;
(Continued)

(56) References Cited

U.S. PATENT DOCUMENTS

| 7,441,422 B2 * | 10/2008 | Choi | ........................ D06F 25/00 366/225 |
| 2002/0029594 A1 * | 3/2002 | Monteiro | ................ D06F 21/04 68/140 |

(Continued)

FOREIGN PATENT DOCUMENTS

| CN | 1195043 A | 10/1998 |
| CN | 1333398 A | 1/2002 |

(Continued)

OTHER PUBLICATIONS

European Search Report from related EP Application No. 15834895.3 dated Apr. 16, 2018.
(Continued)

*Primary Examiner* — Joseph L. Perrin
(74) *Attorney, Agent, or Firm* — Burns & Levinson, LLP; Jospeh M. Maraia

(57) ABSTRACT

A drum washing machine includes an outer tank, configured in a shell; a drum, configured in the outer tank; a rotating body, configured at a rear part of the drum and having protruding parts in contact with washings on a surface of the rotating body; a driving part, capable of operating in a first drying form and a second driving form; and a control part. The first driving form enables the drum and the rotating (Continued)

US 10,422,065 B2

Page 2 body to rotate at different rotating speeds, and the second driving form enables the drum and the rotating body to rotate integrally at the same rotating speed.

1 Claim, 11 Drawing Sheets

(51) Int. Cl.
| | |
|---|---|
| D06F 37/36 | (2006.01) |
| D06F 39/00 | (2006.01) |
| D06F 37/40 | (2006.01) |
| D06F 37/30 | (2006.01) |
| D06F 39/02 | (2006.01) |
| D06F 39/08 | (2006.01) |
| D06F 39/14 | (2006.01) |
| D06F 13/02 | (2006.01) |

(52) U.S. Cl.
CPC ............ *D06F 37/36* (2013.01); *D06F 39/003* (2013.01); *D06F 39/005* (2013.01); *D06F 39/02* (2013.01); *D06F 39/087* (2013.01); *D06F 39/14* (2013.01); *D06F 37/40* (2013.01); D06F 39/002 (2013.01); D06F 2202/02 (2013.01); D06F 2202/085 (2013.01); D06F 2202/10 (2013.01); D06F 2202/12 (2013.01); D06F 2204/065 (2013.01); D06F 2204/084 (2013.01); D06F 2204/086 (2013.01); D06F 2204/10 (2013.01); D06F 2216/00 (2013.01)

(58) Field of Classification Search
CPC ............ D06F 39/003; D06F 2202/065; D06F 2202/10; D06F 2202/12; D06F 2204/06; D06F 2204/065

See application file for complete search history.

(56) References Cited

U.S. PATENT DOCUMENTS

| | | | |
|---|---|---|---|
| 2004/0035155 A1* | 2/2004 | Yoon ................ | D06F 23/02 68/145 |
| 2004/0163429 A1* | 8/2004 | Lim ................. | D06F 37/40 68/140 |
| 2006/0207299 A1* | 9/2006 | Okazaki ............ | D06F 39/003 68/12.02 |
| 2013/0111676 A1* | 5/2013 | Jun ................. | H02K 21/12 8/137 |
| 2013/0118212 A1* | 5/2013 | Jun ................. | H02K 21/12 68/140 |
| 2014/0366283 A1* | 12/2014 | Jun ................. | D06F 37/304 8/137 |

FOREIGN PATENT DOCUMENTS

| | | | |
|---|---|---|---|
| CN | 2576758 Y | | 10/2003 |
| CN | 1551939 A | | 1/2004 |
| CN | 202519478 U | | 11/2012 |
| JP | 03051080 A | * | 3/1991 |
| JP | 2003311074 A | | 11/2003 |
| JP | 2006158488 A | | 6/2006 |
| JP | 2010227312 A | | 10/2010 |
| JP | 2011120755 A | | 6/2011 |
| JP | 2013052053 A | | 3/2013 |
| KR | 20050015686 A | | 2/2005 |

OTHER PUBLICATIONS

Chinese Office Action dated Jul. 19, 2019, for related Application No. 201580046631.X.

* cited by examiner (a)

(b)

(c)

| Load quantity | Difference |
|---|---|
| M1 | Less than C1 |
| M2 | Greater than or equal to C1 and less than C2 |
| M3 | Greater than or equal to C2 and less than C3 |
| ⋮ | ⋮ |
| Mn | Greater than or equal to Cn and less than Cn+1 |

802a

Load quantity table

| Load quantity | Water supply quantity |
|---|---|
| M1 | L1 |
| M2 | L2 |
| M3 | L3 |
| ⋮ | ⋮ |
| Mn | Ln |

802b

Water supply quantity table

| Load quantity | Detergent quantity |
|---|---|
| M1 | G1 |
| M2 | G2 |
| M3 | G3 |
| ⋮ | ⋮ |
| Mn | Gn |

802c

Detergent quantity table $M1 < M2 < M3 \cdots < Mn$ $C1 < C2 < C3 \cdots < Cn < Cn+1$ $L1 < L2 < L3 \cdots < Ln$ $G1 < G2 < G3 \cdots < Gn$

FIG.8

DRUM WASHING MACHINE

TECHNICAL FIELD

The present disclosure relates to a drum washing machine, which not only can be continuously operated from washing to drying, but also can carry out washing without drying.

BACKGROUND

In the past, before carrying out water supply in a washing process, a load quantity of washings in a drum is usually detected in a drum washing machine, and a water supply quantity and a detergent quantity are set according to the load quantity. The load quantity is detected, for example, based on a rotating load applied to the drum when the drum is accelerated to rotate to a rotating speed that washings are attached to an inner circumferential surface of the drum (with reference to patent literature 1).

The larger the load quantity of washings is, the larger the rotating load applied to the drum is. Therefore, the rotating load applied to the drum may be detected with a manner that, for example, the magnitude of the driving current provided for a driving motor of a driving drum, and a structure is judged that the larger the load quantity is, the larger the rotating load is.

CURRENT TECHNICAL LITERATURE

Patent Literature

Patent Literature 1: Japanese Laid-Open Patent Publication No. 2013-052053

SUMMARY

Problems to be Solved in the Disclosure

FIGS. 11(a) and (b) are diagrams schematically illustrating a state of washings in a drum when detecting a load quantity, and FIG. 11(c) is a diagram schematically illustrating a relationship between the load quantity and a driving current of a driving motor. FIG. 11(a) is a situation that the load quantity is small, and FIG. 11(b) is a situation that the load quantity is large.

After the drum is accelerated to rotate from a stop state to detect the load quantity, as shown in FIGS. 11(a) and (b), after a while, washings are attached to an inner circumferential surface of the drum due to an effect of a centrifugal force, and become annular.

The larger the inertia moment which acts when the drum is accelerated to rotate, the larger a rotating load applied to the drum is. The larger the load weight is, the larger a hollow inside diameter D is and the larger the inertia moment generated by the annular load is.

As shown in FIG. 11(a), when the load quantity is small, since the inner perimeter L of the ring formed by washings is large, the hollow inside diameter D is also difficult to become smaller suddenly, even if the load quantity is increased. However, as shown in FIG. 11(b), when the load quantity becomes larger and washings are stacked near the center of the drum, since the inner perimeter L is shortened, the hollow inside diameter D is easily reduced sharply after the load quantity is increased.

Therefore, when the load quantity becomes larger, and even if the weight is increased by increasing the load quantity, the inertia moment is also difficult to increase compared with that when the load quantity is small, since the decrement of the hollow inside diameter D is largened, and the rotating load applied to the drum is also difficult to increase. Therefore, as shown in FIG. 11(c), the slope of a load quantity-current characteristic line illustrating the relationship between the load quantity and the driving current of the driving motor becomes smaller when reaching the areas with a large load quantity.

In this way, based on the rotating load applied to the drum when the drum is accelerated to rotate to a rotating speed that washings are attached to the inner circumferential surface of the drum, a problem exists that the detection precision of the load quantity is reduced in a structure of detecting the load quantity, due to the change of the rotating load applied to the drum along with the increase of the load quantity when the load quantity becomes larger, namely, the change of the driving current flowing to the driving motor is reduced.

The present disclosure is completed in view of this problem, for the purpose of providing a drum washing machine capable of enhancing the detection precision of the load quantity.

Solution for Solving the Problems

A drum washing machine in a main embodiment of the present disclosure includes: an outer tank, configured in a shell; a drum, configured in the outer tank and capable of rotating by using a horizontal axis or an inclination axis inclining relative to a horizontal direction as a center; a rotating body, configured at a rear part of the drum and provided with a protruding part in contact with washings on a surface of the rotating body; a driving part, capable of operating in a first driving form and a second driving form, wherein the first driving form is a driving form that enables the drum and the rotating body to rotate at different rotating speeds and the second driving form is a driving form that enables the drum and the rotating body to integrally rotate at a same rotating speed; and a control part, wherein the control part enables the driving part to operate in the first driving form so that the drum accelerates to rotate to an attaching speed at which washings can be attached to an inner circumferential surface of the drum, and the control part detects the load quantity of washings in the drum based on a rotating load applied to the drum and the rotating body that rotates relative to the drum when the drum accelerates to rotate to the attaching speed.

According to the above technical solution, in the areas with the large load quantity in a detection range of the load quantity, even if the variation of the rotating load of the drum is reduced relative to the increment of the load quantity, a reduced part can also be compensated by increasing the variation of the rotating load of the rotating body. Thus, the reduction of the detection precision of the load quantity in the areas with the large load quantity can be prevented, and therefore, the overall detection precision of the load quantity can be enhanced.

In the drum washing machine in the present embodiment, the driving part includes a driving motor that generates a torque for enabling the drum and the rotating body to rotate. In addition, the drum washing machine further includes a motor driving part for providing driving current to the driving motor, and a current detecting part for detecting the driving current. In this case, the control part detects the load quantity according to size of the driving current detected by the current detecting part when the drum accelerates to rotate to the attaching speed.

According to the above technical solution, since the rotating load applied to the drum and the rotating load applied to the rotating body are detected according to the size of the driving current of the driving motor for driving the drum and the rotating body, two rotating loads can be easily integrated for detection.

Under a condition of adopting the above technical solution, further, the control part can be configured to: enable the driving part to operate in the first driving form so that the drum accelerates to rotate to a first attaching speed at which washings can be attached to the inner circumferential surface of the drum and then accelerates to rotate to a second attaching speed higher than the first attaching speed; and to detect the load quantity according to a difference between a size of the driving current detected by the current detecting part when the drum accelerates to rotate to the second attaching speed and a size of the driving current detected by the current detecting part when the drum accelerates to rotate to the first attaching speed.

The driving current of the driving motor may have a deviation due to voltage change of an external commercial power supply and a manufacturing error of products. In case of adopting the above technical solution, since the solution is designed to acquire a difference between the magnitudes of the driving current when the drum is accelerated to rotate to two attaching speeds and the load quantity is detected according to such difference, the deviation generated by the voltage change and the manufacturing error can be offset, and the detection precision of the load quantity can be further improved.

Effects of the Disclosure

According to the present disclosure, a drum washing machine can be provided, capable of enhancing the detection precision of the load quantity.

Effects and significances of the present disclosure are further clarified by embodiments shown below. However, the following embodiments are just an illustration when the present disclosure is implemented, and the present disclosure is not limited by technical solutions described in the following embodiments.

BRIEF DESCRIPTION OF DRAWINGS

FIGS. 8(a) to 8(c) are diagrams illustrating a load quantity table, a water supply quantity table and a detergent quantity table in embodiments;

DETAILED DESCRIPTION

Hereinafter, a drum washing machine with a drying function as an embodiment of the drum washing machine in the present disclosure is described by referring to drawings.

Figure 1:
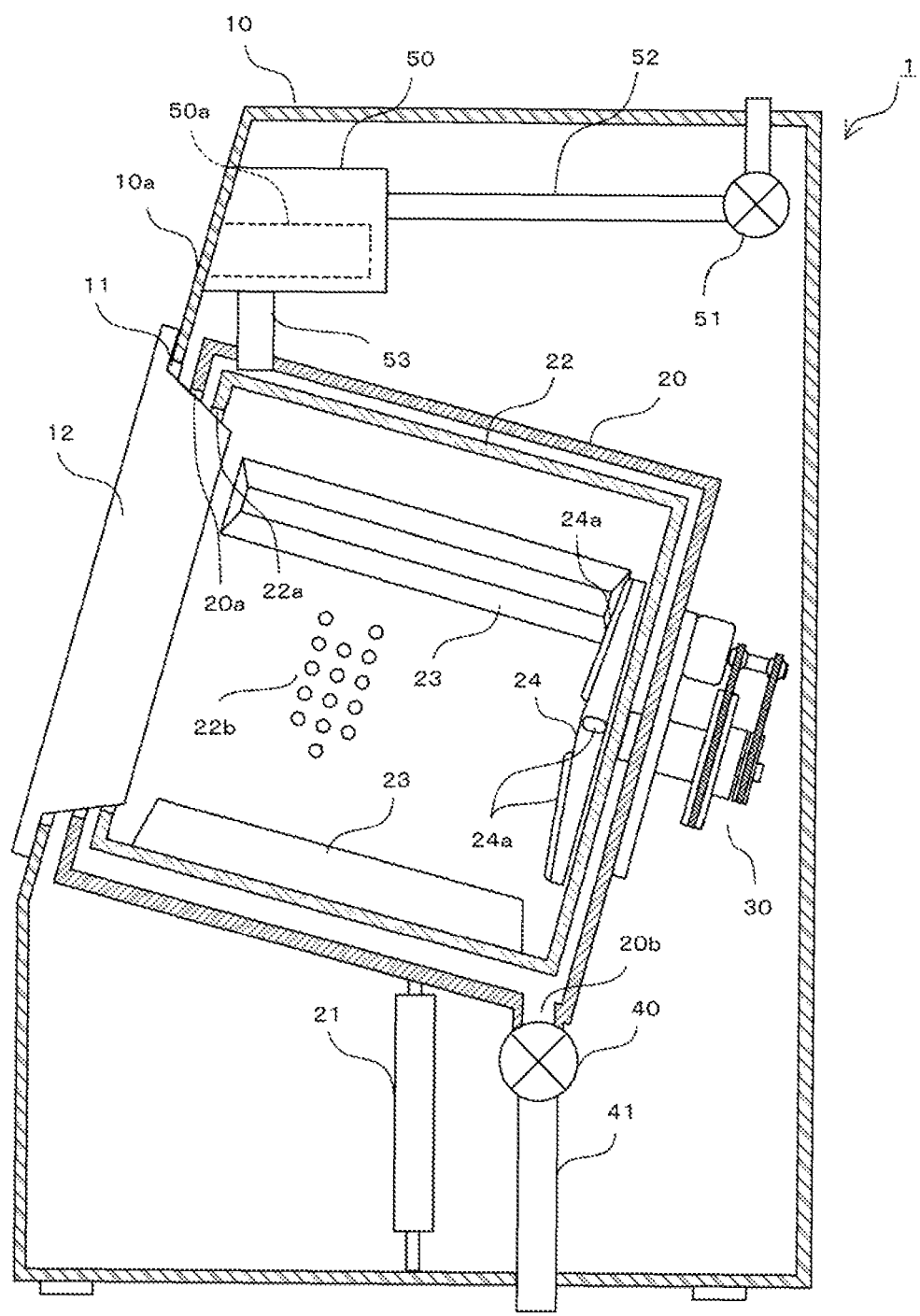
FIG. 1 is a side sectional view illustrating a structure of a drum washing machine in embodiments.

FIG. 1 is a side sectional view illustrating a structure of a drum washing machine 1.

The drum washing machine 1 includes a shell 10 forming an appearance. A front surface 10a of the shell 10 is inclined from a central part to an upper part, and a throwing inlet 11 of washings is formed in an inclined surface. The throwing inlet 11 is covered by a door 12 which is freely openable and closable.

An outer tank 20 is elastically supported by a plurality of vibration dampers 21 in the shell 10. A drum 22 is configured in the outer tank 20 in a freely rotatable manner. The outer tank 20 and the drum 22 are inclined in such a manner that a rear surface side is lowered relative to a horizontal direction. Thus, the drum 22 rotates by taking an inclination axis inclining relative to the horizontal direction as a center. Inclination angles of the outer tank 20 and the drum 22 are set as about 10-20 degrees. An opening part 20a on the front surface of the outer tank 20 and an opening part 22a on the front surface of the drum 22 are opposite to the throwing inlet 11, and are closed together with the throwing inlet 11 by the door 12. A plurality of dewatering holes 22b are formed in a circumferential wall of the drum 22. Further, three baffles 23 are arranged in the circumferential direction at roughly equal intervals on the inner circumferential surface of the drum 22.

A rotating body 24 is configured at the rear of the drum 22 in a freely rotatable manner. The rotating body 24 has a roughly disc shape. A plurality of protruding parts 24a that radially extend from the central part are formed in the surface of the rotating body 24. The rotating body 24 coaxially rotates with the drum 22.

A driving unit 30 generating a torque for driving the drum 22 and the rotating body 24 is configured at the rear of the outer tank 20. The driving unit 30 is equivalent to a driving part of the present disclosure. The driving unit 30 enables the drum 22 and the rotating body 24 to rotate at different rotating speeds in the same direction in a washing process and a rinsing process.

Specifically, the driving unit 30 enables the drum 22 to rotate at a rotating speed that centrifugal force applied to washings in the drum 22 is smaller than gravity of the washings, and the rotating body 24 rotates at a rotating speed higher than the rotating speed of the drum 22. On the other hand, the driving unit 30 enables the drum 22 and the rotating body 24 to integrally rotate at a rotating speed that the centrifugal force applied to washings in the drum 22 is much larger than the gravity of the washings in a dewatering process. A detailed structure of the driving unit 30 is described below.

A water outlet part 20b is formed at the bottom of the outer tank 20. A drainage valve 40 is configured in the water outlet part 20b. The drainage valve 40 is connected with a drainage hose 41. When the drainage valve 40 is opened, water stored in the outer tank 20 would be discharged out of the machine by the drainage hose 41.

A detergent box 50 is configured on the upper front part of the shell 10. A detergent container 50a containing detergents is contained in the detergent box 50 from the front in a freely withdrawable manner. The detergent box 50 is connected with a water supply valve 51 configured on the upper rear part of the shell 10 through a water supply hose 52. In addition, the detergent box 50 is connected with the upper part of the outer tank 20 through a water injection pipe 53. When the water supply valve 51 is opened, tap water from a faucet is supplied into the outer tank 20 by virtue of a water supply hose 52, the detergent box 50 and the water injection pipe 53. At this moment, the detergents contained in the detergent container 50a are supplied into the outer tank 20 along with a water flow.

Then, a structure of the driving unit 30 is described in detail.

Figure 2:
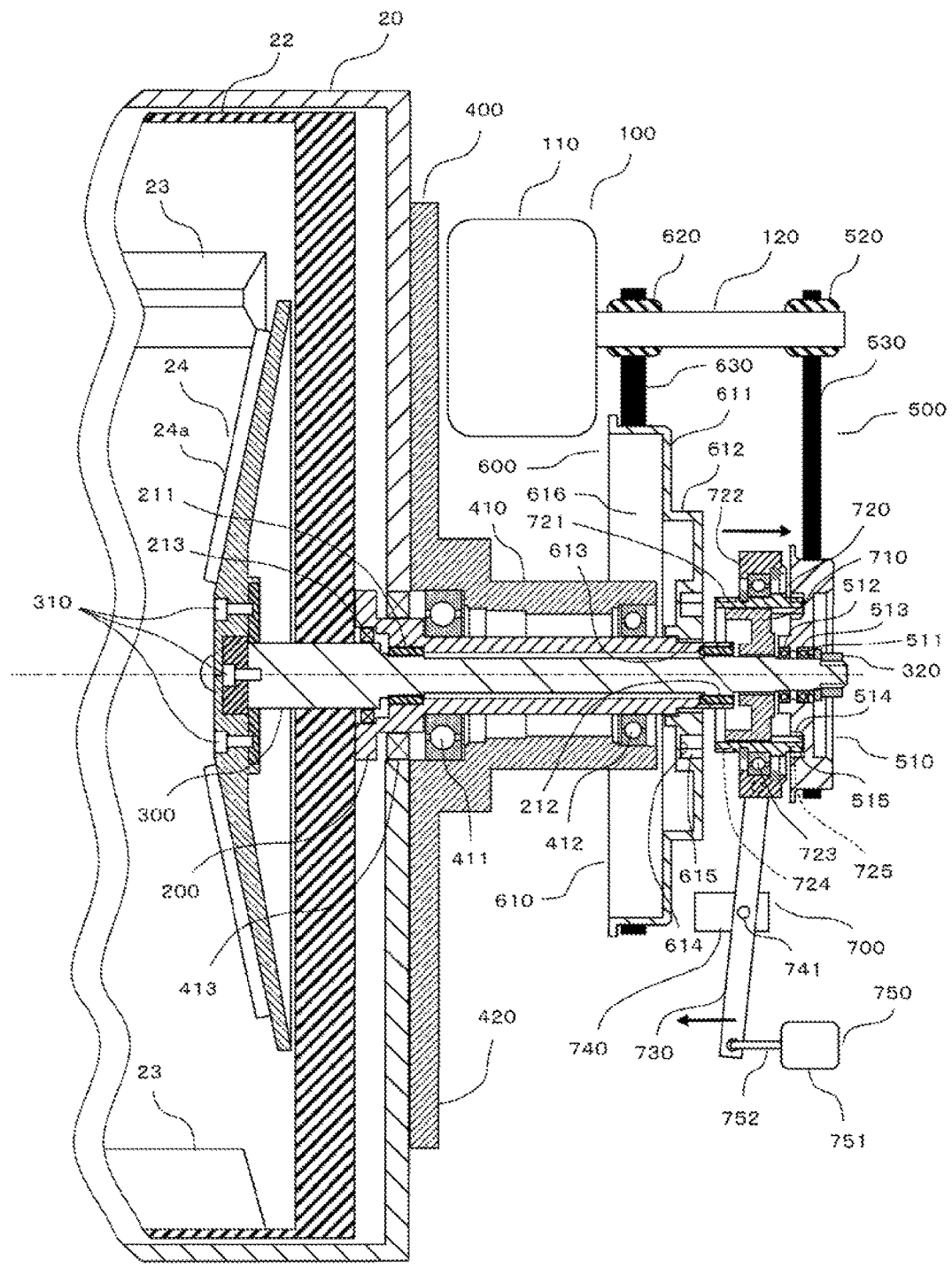
FIG. 2 is a sectional view illustrating a structure of a driving part in embodiments.
Figure 3:
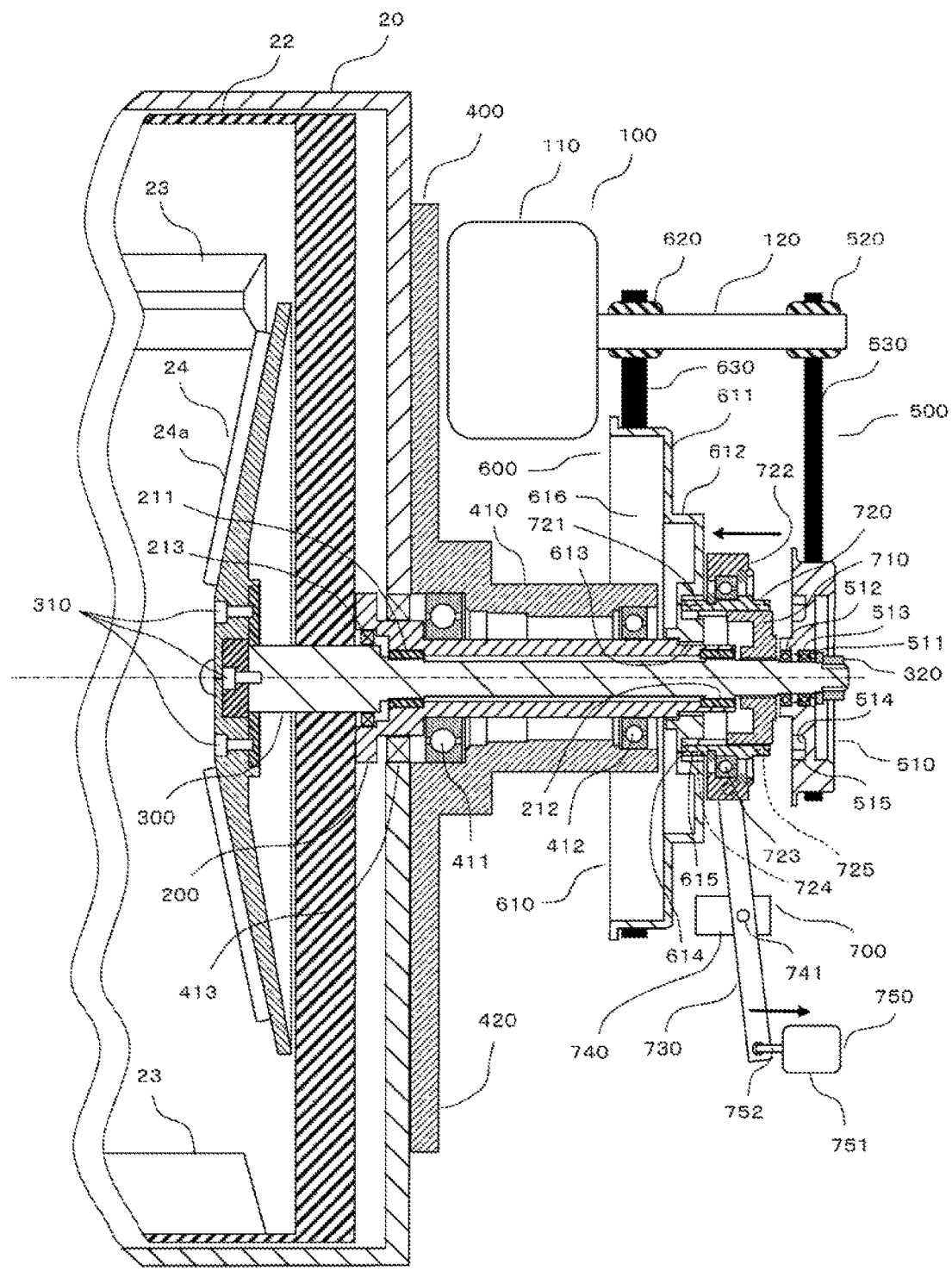
FIG. 3 is a sectional view illustrating a structure of a driving part in embodiments.
Figure 4:
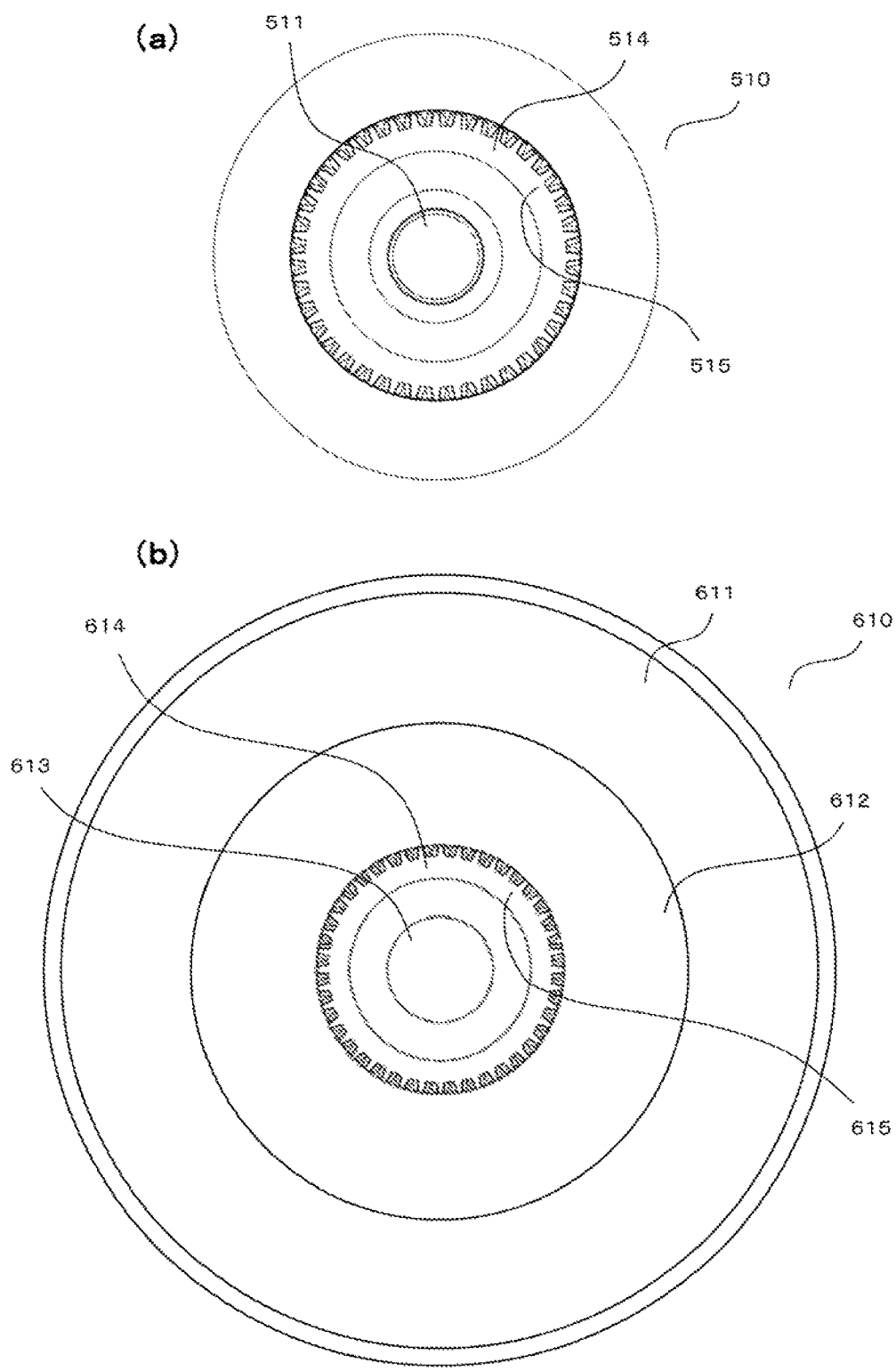
FIGS. 4(a) and 4(b) are diagrams illustrating structures of a wing belt wheel and a drum belt wheel in embodiments.
Figure 5:
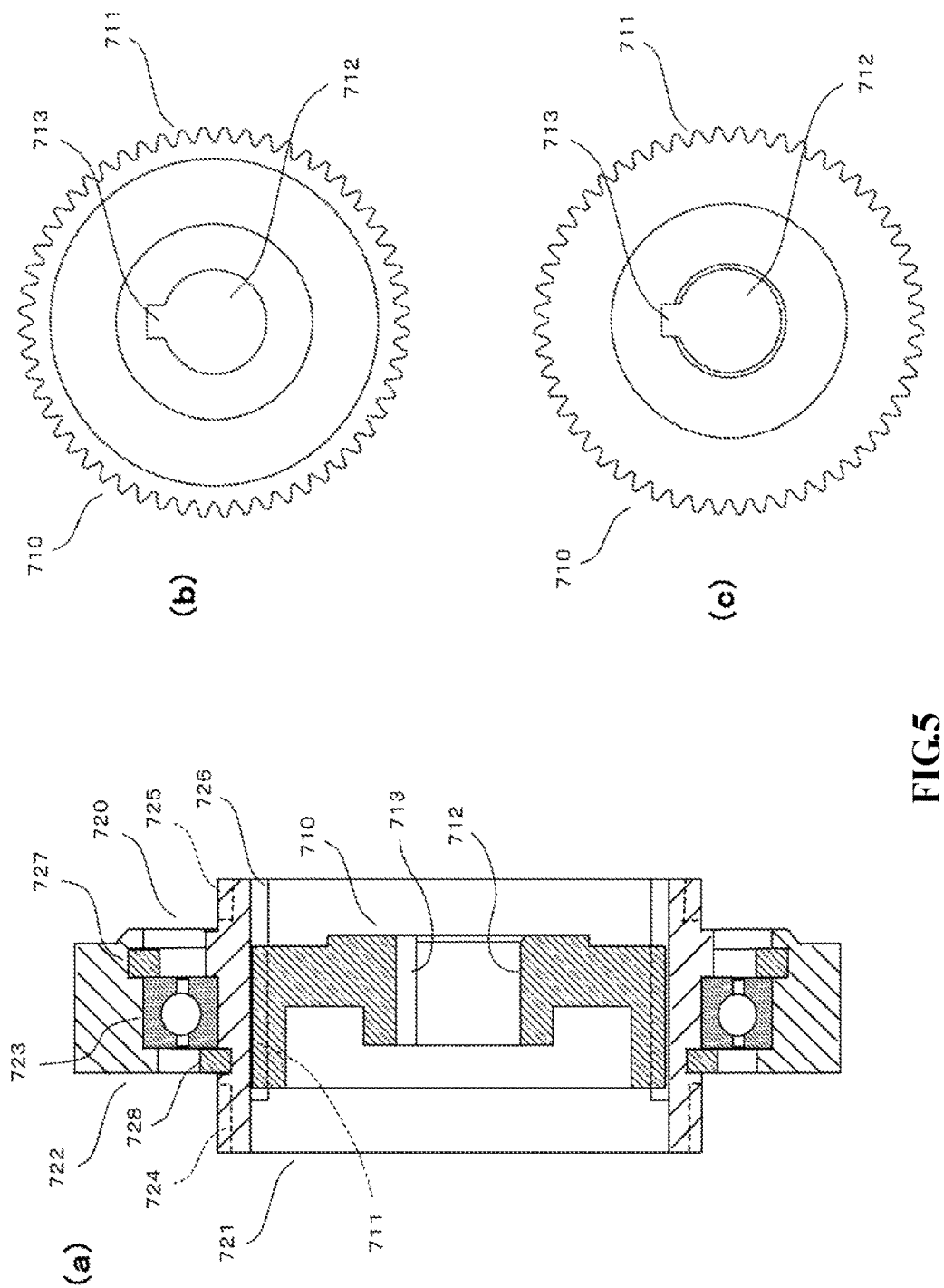
FIGS. 5(a) to 5(c) are diagrams illustrating structures of a clutch guider and a clutch body in embodiments.
Figure 6:
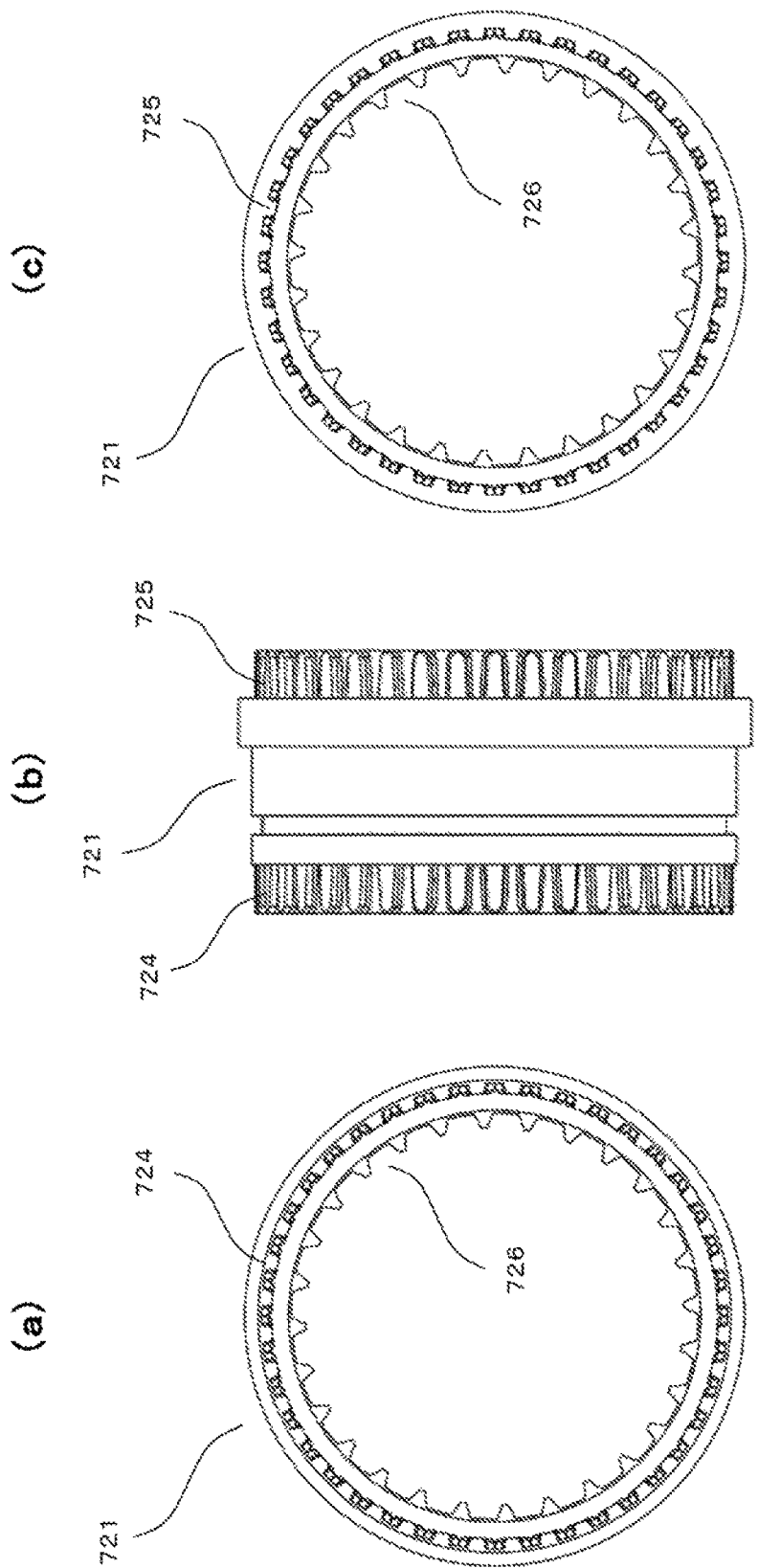
FIGS. 6(a) to 6(c) are diagrams illustrating structures of a clutch part forming a clutch body in embodiments.

FIG. 2 and FIG. 3 are sectional views illustrating a structure of the driving unit 30. FIG. 2 shows a state of switching a driving form of the driving unit 30 to a biaxial driving form. FIG. 3 shows a state of switching a driving form of the driving unit 30 to a uniaxial driving form. FIG. 4 is a diagram illustrating a wing belt wheel 510 and a drum belt wheel 610. FIG. 4(a) is a diagram illustrating the wing belt wheel 510 viewed from the front, and FIG. 4(b) is a diagram illustrating the drum belt wheel 610 viewed from the rear. FIG. 5 is a diagram illustrating a structure of a clutch guider 710 and a clutch body 720. FIG. 5(a) is a side sectional view illustrating a clutch guider 710 and a clutch body 720, FIG. 5(b) is a diagram illustrating the clutch guider 710 viewed from the front, and FIG. 5(c) is a diagram illustrating the clutch guider 710 viewed from the rear. FIG. 6 is a diagram illustrating a structure of a clutch part 721 forming the clutch body 720. FIG. 6(a) is a diagram illustrating the clutch part 721 viewed from the front, FIG. 6(b) is a side view illustrating the clutch part 721 and FIG. 6(c) is a diagram illustrating the clutch part 721 viewed from the rear.

The driving part 30 includes: a driving motor 100, a first rotating shaft 200, a second rotating shaft 300, a bearing unit 400, a wing decelerating mechanism 500, a drum decelerating mechanism 600 and a clutch mechanism part 700.

The driving motor 100 generates torques for driving the rotating body 24 and the drum 22; the driving motor 100 is, for example, an outer rotor type DC brushless motor; and a motor shaft 120 connected with a rotor in the shell 110 of the motor extends backwards from the shell 110.

The first rotating shaft 200 is of a hollow shape; a first sliding bearing 211 and a second sliding bearing 212 are respectively arranged at a front part and a rear part inside the first rotating shaft 200; and a mechanical sealing element 213 is arranged at a front end part.

The second rotating shaft 300 is encircled in the first rotating shaft 200; the front part of the second rotating shaft 300 protrudes forward from the first rotating shaft 200; the rear part of the second rotating shaft 300 protrudes backwards from the first rotating shaft 200; the outer circumferential surface of the second rotating shaft 300 is supported by the first sliding bearing 211 and the second sliding bearing 212, and the second rotating shaft 300 smoothly rotates within the first rotating shaft 200; and in addition, water is prevented from entering between the second rotating shaft 300 and the first rotating shaft 200 through the mechanical sealing element 213.

A bearing part 410 with a roughly cylindrical shape is arranged in the central part of the bearing unit 400; a first rolling bearing 411 and a second rolling bearing 412 are respectively arranged on the front part and the rear part inside the bearing part 410; a mechanical sealing element 413 is arranged at the front end part; the outer circumferential surface of the first rotating shaft 200 is supported by the first rolling bearing 411 and the second rolling bearing 412, and the first rotating shaft 200 smoothly rotates within the bearing part 410; in addition, water is prevented from entering between the first rotating shaft 200 and the bearing part 410 through the mechanical sealing element 413. Furthermore, a fixing flange part 420 is formed around the bearing part 410 of the bearing unit 400.

The bearing unit 400 is fixed on the rear surface of the outer tank 20 by a fixing method such as screw fastening and the like through the fixing flange part 420; the second rotating shaft 300 and the first rotating shaft 200 enter the interior of the outer tank 20 when the bearing unit 400 is mounted in the outer tank 20; the drum 22 is fixed to the first rotating shaft 200 by a screw not shown in figures; and the rotating body 24 is fixed to the second rotating shaft 300 by a screw 310.

The wing decelerating mechanism 500 includes a wing belt wheel 510, a first motor belt wheel 520 and a wing transmission belt 530; the rotation of the driving motor 100 is decelerated according to a deceleration ratio determined by an outer diameter ratio of the wing belt wheel 510 and the first motor belt wheel 520 and is transmitted to the second rotating shaft 300.

The wing belt wheel 510 is supported by the rear end part of the second rotating shaft 300 in a freely rotatable manner; an insertion hole 511 into which the second rotating shaft 300 is inserted is formed in the central part of the wing belt wheel 510; a front and a rear rolling bearings 512 and 513 are clamped between the insertion hole 511 and the second rotating shaft 300; and the wing belt wheel 510 smoothly rotates relative to the second rotating shaft 300 through the two rolling bearings 512 and 513.

As shown in FIG. 4(a), an annular engaged recess part 514 is formed on a front surface of the wing belt wheel 510; a rack 515 is formed on the outer circumferential surface of the engaged recess part 514 throughout the entire circumference; and the wing belt wheel 510 is prevented from falling backward through a fixing screw 320 mounted at the rear end part of the second rotating shaft 300.

The first motor belt wheel 520 is mounted at the front end part of the motor shaft 120 of the driving motor 100; and the wing transmission belt 530 is erected between the wing belt wheel 510 and the first motor belt wheel 520.

The drum decelerating mechanism 600 includes a drum belt wheel 610, a second motor belt wheel 620 and a drum transmission belt 630; the rotation of the driving motor 100 is decelerated according to the deceleration ratio determined by the outer diameter ratio of the drum belt wheel 610 and the second motor belt wheel 620 and is transmitted to the first rotating shaft 200.

The drum belt wheel 610 is formed as a disc shape with an opened front surface, and includes a belt wheel part 611 and a fixing part 612 which has an outer diameter smaller than that of the belt wheel part 611. The deceleration ratio generated by the drum reduction mechanism 600 is greater than the deceleration ratio generated by the wing decelerating mechanism 500 due to the outer diameter of the belt wheel part 611, i.e., the outer diameter of the drum belt wheel 610 is greater than the outer diameter of the wing belt wheel 510.

An insertion hole 613 is formed in the central part of the fixing part 612; the rear end part of the first rotating shaft 200 is inserted into the insertion hole 613 and is fixed in the insertion hole 613 by a defined fixing method such as pressing with the rack, and the like; as a result, the drum belt wheel 610 is fixed at the rear end part of the first rotating shaft 200.

As shown in FIG. 4(b), an annular engaged recess part 614 is formed on the rear surface of the fixing part 612 in the outer circumference of the insertion hole 613; and a rack 615 is formed on the outer circumferential surface of the engaged recess part 614 throughout the entire circumference.

The rear end part of the bearing part 410 is accommodated in a recess part 616 recessed backwards, i.e., the interior of the belt wheel part 611; and as a result, the bearing unit 400 is overlapped with the drum belt wheel 610 in a front-and-back direction of the driving part 30.

The second motor belt wheel 620 is mounted at a root part of the motor shaft 120 of the driving motor 100; and a drum transmission belt 630 is erected between the drum belt wheel 610 and the second motor belt wheel 620.

The clutch mechanism part 700 switches the driving form of the driving part 30 between the biaxial driving form and the uniaxial driving form, wherein the biaxial driving form refers to a form that the second rotating shaft 300 can be connected with the wing belt wheel 510 in a manner of transmitting the rotation of the wing belt wheel 510 to the second rotating shaft 300 so as to rotate the drum 22 and the rotating body 24 at mutually different rotating speeds; the uniaxial driving form refers to a form that the second rotating shaft 300 can be connected with the drum belt wheel 610 in a manner of transmitting the rotation of the drum belt wheel 610 to the second rotating shaft 300 so as to rotate the drum 22 and the rotating body 24 at the same rotating speed. The biaxial driving form is equivalent to the first driving form of the present disclosure; and the uniaxial driving form is equivalent to the second driving form of the present disclosure.

The clutch mechanism part 700 includes a clutch guider 710, a clutch body 720, a clutch lever 730, a lever supporting part 740 and a clutch driving apparatus 750.

The clutch guider 710 and the clutch body 720 are configured between the drum belt wheel 610 and the wing belt wheel 510 in parallel on an axis direction of the first rotating shaft 200 and the second rotating shaft 300.

As shown in FIG. 5, the clutch guider 710 is of a cylindrical shape with an opened front surface; a rack 711 is formed on the entire outer circumferential surface of the clutch guider 710 throughout the entire circumference; an insertion hole 712 is formed in the central part of the clutch guider 710; the insertion hole 712 is formed with a keyway 713; the clutch guider 710 is penetrated by the second rotating shaft 300 through the insertion hole 712 and is fixed to the second rotating shaft 300 by a fixing method performed by using the keyway 713 and a key not shown in the figures; and as a result, the clutch guider 710 rotates together with the second rotating shaft 300.

As shown in FIG. 5(a), the clutch body 720 includes a clutch part 721, a surrounding part 722 and a rolling bearing 723. The clutch part 721 is of a cylindrical shape with an opened front surface and an opened rear surface; as shown in FIG. 6, a front rack 724 and rear rack 725 are respectively formed at the front part and the rear part on the outer circumferential surface of the clutch part 721 throughout the entire circumference.

An inner diameter of the clutch part 721 is roughly equal to the outer diameter of the clutch guider 710; a front-and-back dimension of the clutch part 721 is set to be larger than the front-and-back dimension of the clutch guider 710; the clutch guider 710 is inserted into the interior of the clutch part 721; an inner rack 726 is formed on the inner circumferential surface of the clutch part 721 throughout the entire circumference; the inner rack 726 is meshed with the rack 711 of the clutch guider 710; and the front-and-back dimension of the inner rack 726 is set to be greater than the front-and-back dimension of the rack 711.

The clutch part 721 is in a state that the clutch part 721 can move to the axis direction of the second rotating shaft 300 relative to the clutch guider 710, i.e., the second rotating shaft 300 where the clutch guider 710 is fixed, and can rotate together with the second rotating shaft 300, by the engagement of the inner rack 726 and the rack 711.

The encircling part 722 is formed in an annular shape and encircles the central part of the clutch part 721 in a manner of enabling the clutch part 721 to rotate freely; a rolling bearing 723 is arranged between the clutch part 721 and the encircling part 722; the rolling bearing 723 is fixed by a large and a small retaining rings 727 and 728 in a manner of prohibiting forward and backward movements; and the clutch part 721 smoothly rotates relative to the encircling part 722 through the rolling bearing 723.

The clutch lever 730 is connected with the encircling part 722 in a manner of enabling the upper end part of the clutch lever 730 to rotate relative to the encircling part 722; and in addition, the clutch lever 730 is supported on a fulcrum shaft 741 arranged on the level supporting part 740 in the freely rotatable manner.

The clutch driving apparatus 750 includes an actuator 751 and an operation lever 752. The actuator 751 enables the operation lever 752 to move forward and backward; the operation lever 752 is connected with the lower end part of the clutch lever 730; and the lower end part of the clutch lever 730 is rotatable relative to the operation lever 752.

The level supporting part 740 and the clutch driving apparatus 750 are fixed on a mounting plate not shown in the figures, and the mounting plate is mounted on the bearing unit 400 or the outer tank 20.

It should be noted that the clutch lever 730, the lever supporting part 740 and the clutch driving apparatus 750 constitute a moving mechanism part for enabling the clutch body 720 to move.

As shown in FIG. 2, the operation lever 752 is pushed forward from the interior of an actuator 751 when the driving form of the driving part 30 is switched from the uniaxial driving form to the biaxial driving form; the lower end part of the clutch lever 730 is pushed by the operation lever 752 to move forward; the clutch lever 730 rotates backwards by using the fulcrum shaft 741 as the center; the upper end part of the clutch lever 730 moves backwards; the clutch body 720 is pushed by the upper end part of the clutch lever 730 to move backwards; and as a result, the rear rack 725 of the clutch part 721 is engaged with the rack 515 of the wing belt wheel 510.

When the rear rack 725 is engaged with the rack 515, a state that the rotation of the wing belt wheel 510 can be transmitted to the second rotating shaft 300 by the clutch part 721 and the clutch guider 710 is formed since the clutch part 721 and the wing belt wheel 510 are fixed relative to the rotation direction; in this state, the rotation is transmitted to the second rotating shaft 300 by the wing decelerating mechanism 500 when the driving motor 100 is rotated; the rotating body 24 fixed to the second rotating shaft 300 rotates; the rotating body 24 rotates at the rotating speed that the rotating speed of the driving motor 100 decreases as the deceleration ratio generated by the wing decelerating mechanism 500; in addition, the rotation of the driving motor 100 is transmitted to the first rotating shaft 200 by the drum decelerating mechanism 600; the drum 22 fixed to the first rotating shaft 200 rotates; the drum 22 rotates at the rotating speed that the rotating speed of the driving motor 100 decreases as the deceleration ratio generated by the drum decelerating mechanism 600. As described above, the rotating body 24 rotates at the rotating speed higher than that of the drum 22 in the same direction as that of the drum 22 since the deceleration ratio generated by the drum decelerating mechanism 600 is greater than the deceleration ratio generated by the wing decelerating mechanism 500.

Although the clutch part 721 rotates together with the wing belt wheel 510 here, the rotation would not be substantially transmitted to the clutch lever 730 even if the clutch part 721 rotates since the clutch lever 730 is connected with the connected surrounding part 722 which is connected with the clutch part 721 in a freely rotatable state.

On the other hand, as shown in FIG. 3, the operation lever 752 is withdrawn into interior of the actuator 751, namely the operation lever 752 moves backwards, when the driving form of the driving part 30 is switched from the biaxial driving form to the uniaxial driving form; the lower end part of the clutch lever 730 is pulled by the operation lever 752 and moved to the rear; the clutch lever 730 rotates forward by using the fulcrum shaft 741 as the center; the upper end part of the clutch lever 730 moves forward; the clutch body 720 is pushed by the upper end part of the clutch lever 730 to move forward; and as a result, the front rack 724 of the clutch part 721 is engaged with the rack 615 of the drum belt wheel 610.

Since the clutch part 721 and the drum belt wheel 610 are fixed relative to the rotation direction when the front rack 724 is engaged with the rack 615, a state that the rotation of the drum belt wheel 610 can be transmitted to the second rotating shaft 300 through the clutch part 721 and the clutch guider 710 is formed; in this state, the rotation is transmitted to the first rotating shaft 200 and the second rotating shaft 300 by the drum decelerating mechanism 600 when the motor 100 rotates, so that the drum 22 and the rotating body 24 rotate; and the drum 22 and the rotating body 24 integrally rotates in the same direction at the rotating speed that the rotating speed of the driving motor 100 decreases as the deceleration ratio generated by the drum decelerating mechanism 600.

It should be noted that when the driving motor 100 rotates, the wing belt wheel 510 also rotates with the rotation in the uniaxial driving form; however, the wing belt wheel 510 only idles relative to the second rotating shaft 300; and the rotation of the wing belt wheel 510 would not be transmitted to the second rotating shaft 300.

Figure 7:
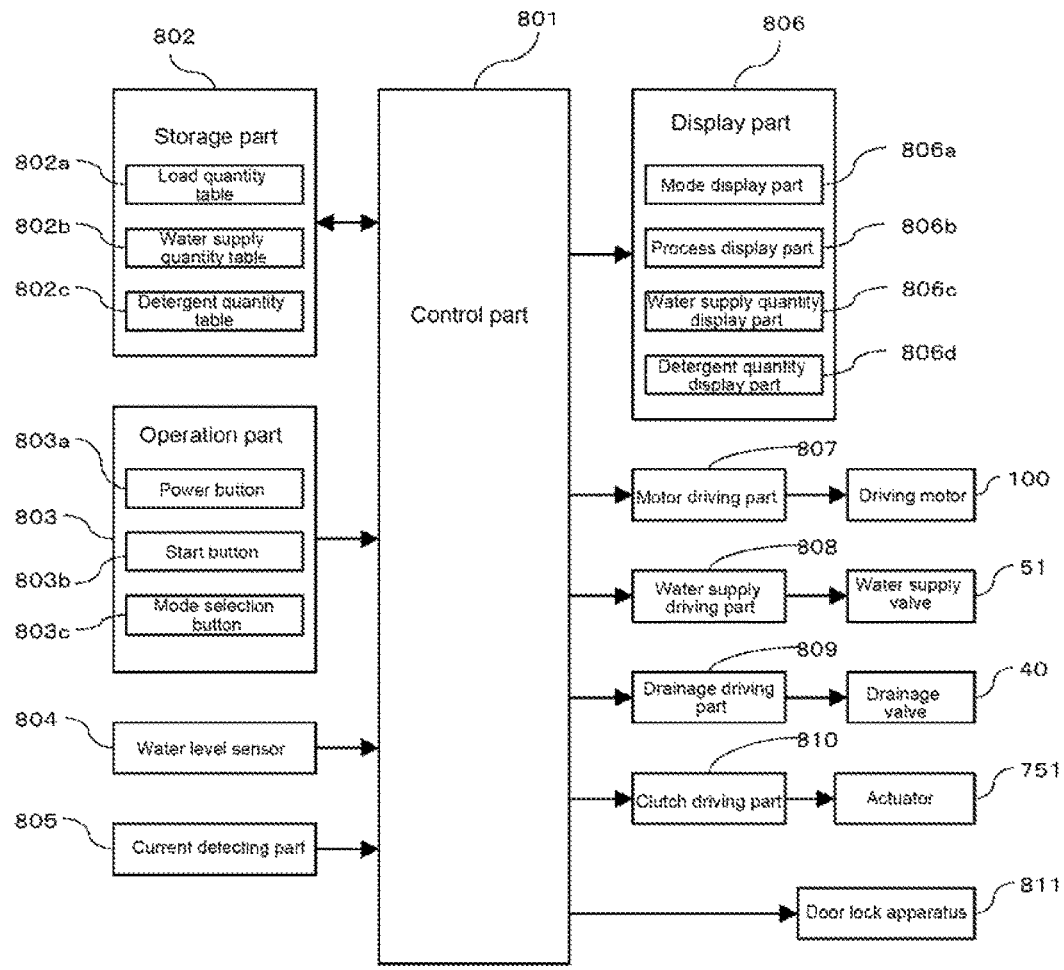
FIG. 7 is a block diagram illustrating a structure of a drum washing machine in embodiments.

FIG. 7 is a block diagram illustrating the structure of the drum washing machine 1.

Besides the above structures, the drum washing machine 1 also includes a control part 801, a storage part 802, an operation part 803, a water level sensor 804, a current detecting part 805, a display part 806, a water supply motor driving part 807, a water supply driving part 808, a drainage driving part 809, a clutch driving part 810 and a door lock apparatus 811.

The operation part 803 includes a power button 803a, a start button 803b and a mode selection button 803c; the power button 803a is a button for turning on and off a power supply of the drum washing machine 1; the start button 803b is a button for starting the washing operation; the mode selection button 803c is a button for selecting any washing mode from a plurality of washing modes for the washing operation; and the operation part 803 outputs an input signal corresponding to a button operated by a user to the control part 801.

The water level sensor 804 detects a water level in the outer tank 20, and outputs a water level detection signal corresponding to the detected water level to the control part 801.

The display part 806 includes a mode display part 806a, a process display part 806b, a water supply quantity display part 806c and a detergent quantity display part 806d. The mode display part 806a displays the washing mode selected by the mode selection button 803c; and the process display part 806b displays the ongoing process during washing operation. The water supply quantity display part 806c displays the quantity, determined according to the load quantity of washings in the drum 22, of water supplied into the outer tank 20, i.e., a water supply quantity. The detergent quantity display part 806d displays the quantity, determined according to the load quantity of washings in the drum 22, of detergents supplied into the drum 22, i.e., a detergent quantity.

The motor driving part 807 supplies driving current to the driving motor 100 in accordance with a control signal from the control part 801; the motor driving part 807 includes a speed sensor for detecting the rotating speed of the driving motor 100, a frequency converter circuit and the like; and the driving current is adjusted so that the driving motor 100 rotates at the rotating speed set by the control part 801.

The current detecting part 805 detects the driving current provided by the motor driving part 807 to the driving motor 100, and outputs a detecting signal corresponding to the size of the driving current to the control part 801.

The water supply driving part 808 supplies the driving current to the water supply valve 51 in accordance with the control signal from the control part 801; the drainage driving part 809 supplies the driving current to the drainage valve 40 in accordance with the control signal from the control part 801.

The clutch driving part 810 supplies the driving current to the actuator 751 in accordance with the control signal outputted from the control part 801.

The door lock apparatus 811 locks and unlocks a door 12 in accordance with the control signal from the control part 801.

The storage part 802 includes an EEPROM, a RAM and the like; the storage part 802 stores procedures for executing the washing operation of various washing modes; and in addition, the storage part 802 stores various parameters and various control marks for the execution of the procedures.

Further, the storage part 802 includes a load quantity table 802a, a water supply quantity table 802b and a detergent quantity table 802c. FIGS. 8(a), (b) and (c) are diagrams illustrating the load quantity table 802a, the water supply quantity table 802b and the detergent quantity table 802c respectively.

As shown in FIG. 8(a), a plurality of load capacities and a range of a difference between a second current value and a first current value that are corresponding to the load capacities are stored in the load quantity table 802a. The first current value refers to a value of the driving current provided for the driving motor 100 when the drum 22 rotates at a first attaching speed. The first attaching speed is a rotating speed that a centrifugal force applied to washings in the drum 22 is larger than the gravity of the washings and washings are attached to the inner circumferential surface of the drum 22. The second current value refers to a value of the driving current provided for the driving motor 100 when the drum 22 rotates at a second attaching speed higher than the first attaching speed. In addition, the first attaching speed and the second attaching speed are equivalent to a first rotating speed of the prevent disclosure.

Under the condition that drum 22 rotates at the first attaching speed or the second attaching speed, the more the load quantity is, the greater the rotating load applied to the drum 22 is, and thus, the rotating load applied to the driving motor 100 is greater; and therefore, the first current value and the second current value are larger. Under the condition that a certain amount of load capacities are increased, the increment of the second current value is more than that of the first current value. Therefore, the more the load quantity is, the greater the difference between the second current value and the first current value is. In the load quantity table 802a, the greater the difference is, the greater the value of the corresponding load quantity is.

As shown in FIG. 8(b), a plurality of load capacities and water supply quantities corresponding to the load capacities are stored in the water supply quantity table 802b. The more the load quantity is, the more the water volume needed by washing is; and therefore, in the water supply quantity table 802b, the greater the value of the load quantity is, the greater the corresponding water supply quantity is.

As shown in FIG. 8(c), a plurality of load capacities and detergent quantities corresponding to the load capacities are stored in the detergent quantity table 802c. The more the load quantity is, the more the detergent needed by washing is; and therefore, in the detergent quantity table 802c, the greater the value of the load quantity is, the greater the corresponding detergent quantity is.

The control part 801 controls the display part 806, the motor driving part 807, the water supply driving part 808, the drainage driving part 809, the clutch driving part 810, the door lock apparatus 811 and the like according to the procedures stored in the storage part 802 based on the signals from the operation part 803, the water level sensor 804, the current detecting part 805, and the like.

The drum washing machine 1 performs the washing operation of various operation modes according to user selection operation performed by the mode selection button 803c; the washing process, an intermediate dewatering process, the rinsing process and a final dewatering process are sequentially performed in the washing operation; and it should be noted that the intermediate dewatering process and the rinsing process may be performed more than twice sometimes according to the washing mode.

The driving form of the driving part 30 is switched to the biaxial driving form in the washing process and the rinsing process. If water stored in the outer tank 20 does not reach a specified water level at the lower edge of the throwing inlet 11, washings in the drum 22 are immersed into water. In this state, the driving motor 100 performs forward rotation and backward rotation alternately. Thus, the drum 22 and the rotating body 24 alternately perform forward rotation and backward rotation in a state that the rotating speed of the rotating body 24 is higher than that of the drum 22. At this moment, the drum 22 rotates at a rotating speed that the centrifugal force acting on washings becomes smaller than the gravity of the washings.

Washings in the drum 22 are lifted up and dropped down by the baffles 23 and are rolled in the drum 22. Thus, washings are thrown to the inner circumferential surface of the drum 22. In addition, washings are in contact with the protruding part 24a of the rotating stirring body 24 at the rear of the drum 22, and washings are rubbed and stirred through the protruding part 24a. Therefore, washings are washed or rinsed.

In this way, since not only mechanical force produced by rotation of the drum 22 but also mechanical force produced by the stirring body 24 can be applied to washings during washing and rinsing, and therefore, improvement of the cleaning performance can be expected. The driving form of the driving part 30 is switched to the uniaxial driving form in an intermediate dewatering process and a final dewatering process. The drum 22 and the rotating body 24 integrally rotate at a rotating speed that the centrifugal force acting on washings in the drum 22 is far larger than the gravity of the washings when the driving motor 100 works. Due to the action of the centrifugal force, washings are pressed on the inner circumferential surface of the drum 22 for dewatering.

In this way, since the drum 22 and the rotating body 24 integrally rotate during dewatering, washings attached to the drum 22 can be well dewatered without the need of stirring washings by the rotating body 24.

In addition, in the drum washing machine 1 of the present embodiment, when starting the washing operation and before washing, the load quantity of washings in the drum 22 is firstly detected, and the water supply quantity and the detergent quantity are determined based on the detected load quantity. The determined water supply quantity and the detergent quantity are displayed by the water supply quantity display part 806c and a detergent quantity display part 806d respectively.

In the present embodiment, the control part 801 enables the driving part 30 to work in the biaxial driving form, so as to accelerate the drum 22 to rotate to the attaching speed that washings are attached to the inner circumferential surface of the drum 22. Moreover, the control part 801 detects the rotating load applied to the drum 22 and the rotating load of the rotating body 24 rotating relative to the drum 22 when the drum 22 is accelerated to rotate to the attaching speed according to the form of the driving current of the driving motor 100, and detects the load quantity according to the two rotating loads, i.e., the magnitude of the driving current indicating the sizes of the two rotating loads.

More specifically, the control part 801 accelerates the drum 22 to rotate to the first attaching speed and then, to rotate to the second attaching speed which is higher than the first attaching speed, the difference between the magnitudes of the driving current, i.e. the difference between the second current value and the first current value, is obtained when acceleration selection at the second attaching speed and the first attaching speed is conducted respectively, and the load quantity is detected according to the difference.

Figure 9:
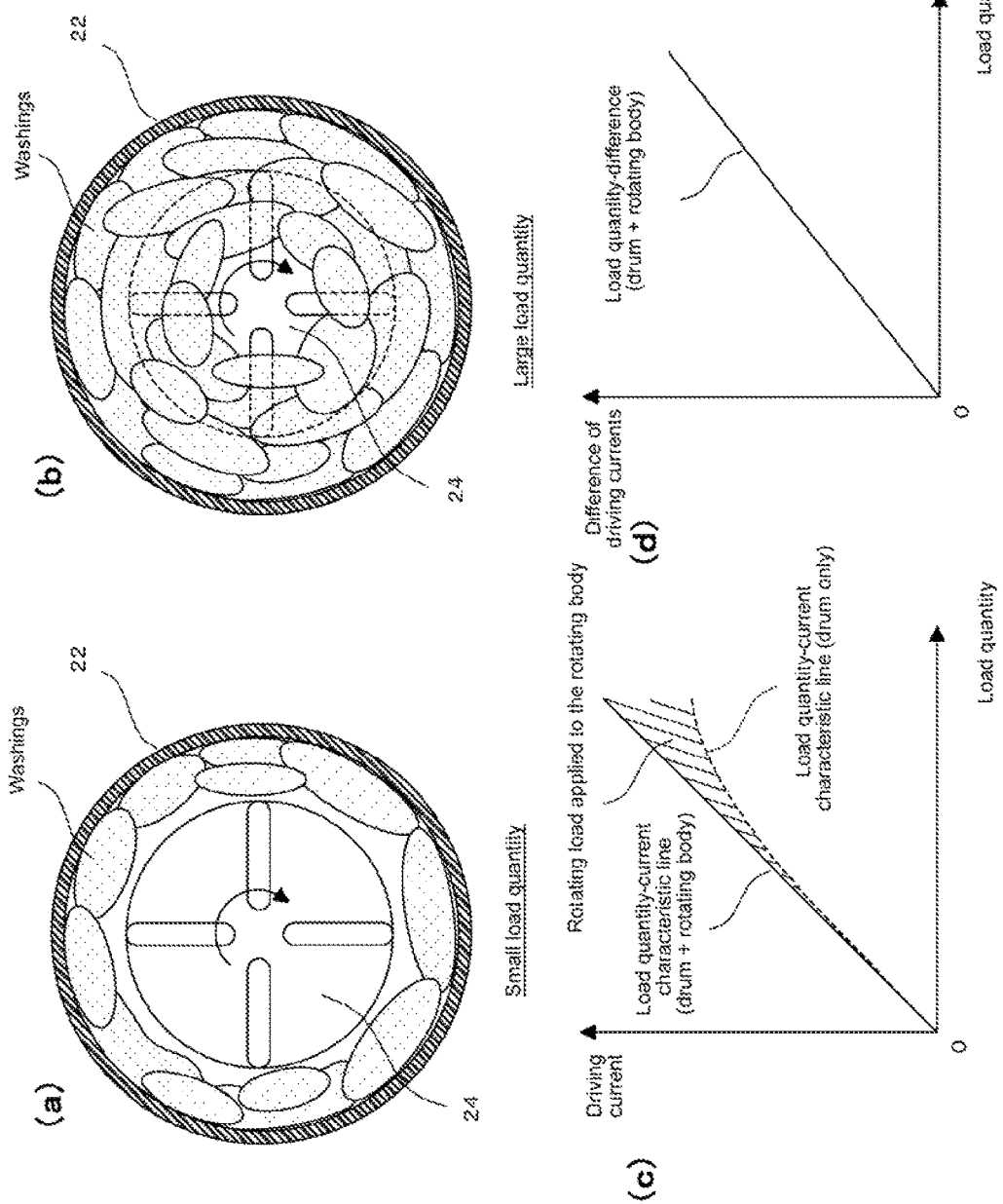
FIGS. 9(a) and 9(b) are diagrams schematically illustrating a state of washings in a drum when the drum is accelerated to rotate to a first attaching speed or a second attaching speed in the present embodiment.
FIG. 9(c) is a diagram schematically illustrating a relationship between a load quantity and a driving current of a driving motor.
FIG. 9(d) is a diagram schematically illustrating a relationship between a load quantity difference and a driving current difference.

FIGS. 9(a) and (b) are diagrams schematically illustrating a state of washings in the drum 22 when the drum 22 is accelerated to rotate to the first attaching speed or the second attaching speed. FIG. 9(c) is a situation that the load quantity is small, and FIG. 9(b) is a situation that the load quantity is large. FIG. 9(c) is a diagram schematically illustrating a relationship between the load quantity and a driving current of a driving motor 100. FIG. 9(d) is a diagram schematically illustrating a relationship between a load quantity difference and a driving current difference.

After the drum 22 is accelerated to rotate from the stop state to detect the load quantity, as shown in FIGS. 9(a) and (b), after a while, washings in the drum are attached to the inner circumferential surface of the drum 22 due to an effect of a centrifugal force, and become annular. In the present embodiment, since the driving form of the driving part 30 is being switched to the biaxial driving form, the rotating body 24 rotates at the rotating speed higher than that of the drum 22. Namely, the rotating body 24 rotates relative to the drum 22.

In case that the load quantity is small like FIG. 9(a), since washings exist near the inner circumferential surface of the drum 22, a large space is vacant in the central part of the drum 22. Therefore, washings are not in contact with the rotating body 24, and the rotating load produced by washings is not applied to the rotating body 24.

On the other hand, as shown in FIG. 9(b), when the load quantity becomes larger, and washings are stacked near the center of the drum 22, the rotating load produced by washings is not applied to the rotating body 24 since washings are not in contact with the rotating body 24.

Figure 11:
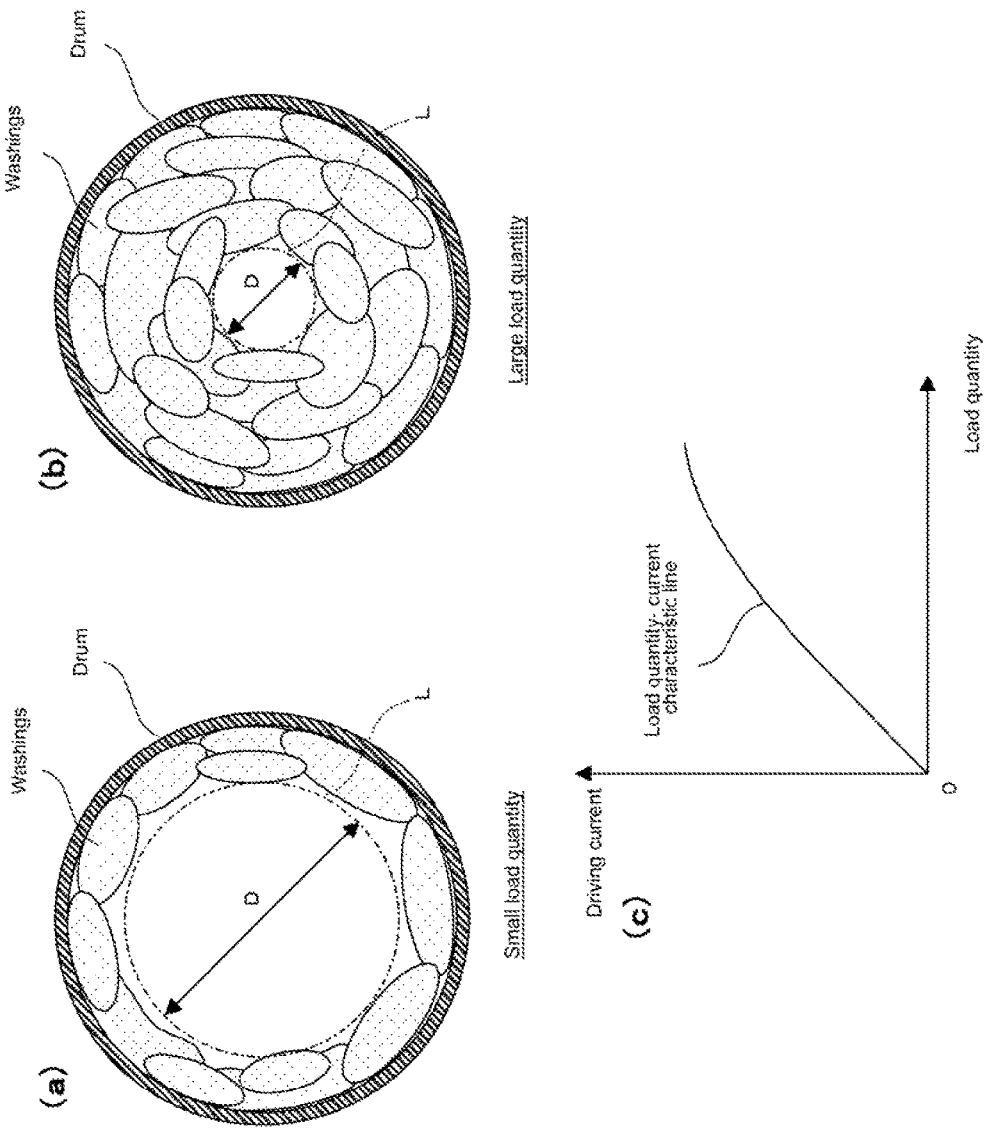
FIGS. 11(a) and 11(b) are diagrams schematically illustrating a state of washings in a drum when a load quantity is detected.
FIG. 11(c) is a diagram schematically illustrating a relationship between the load quantity and a driving current of a driving motor.

As illustrated above by referring to the FIG. 11, when the rotating load of the drum 22 is only detected according to the driving current of the driving motor 100, as shown in a dash line in FIG. 9(c), the slope of a load quantity-current characteristic line illustrating the relationship between the load quantity and the driving current value when the drum is accelerated to rotate to the attaching speed becomes smaller in the areas with the large load quantity. In contrast, like the present embodiment, in case that the rotating loads of the drum 22 and the rotating body 24 are detected according to the driving current of the driving motor 100, and when the load capacities are large, since the rotating load is applied to the rotating body 24 like a slash of FIG. 9(c), as shown in a solid line of FIG. 9(c), the slope of the load quantity-current characteristic line even in the areas with large load capacities is also difficult to become smaller, and is approximately linear as a whole.

Since the load quantity-current characteristic line of the first current value and the second current value is approximately linear, as shown in FIG. 9(d), the load quantity-current characteristic line of the difference between the second current value and the first current value is also approximately linear. The load quantity-difference characteristic line can be pre-calculated through a test, and the various values of the load quantity table 802a in FIG. 8(a) are set according to the load quantity-difference characteristic line.

Figure 10:
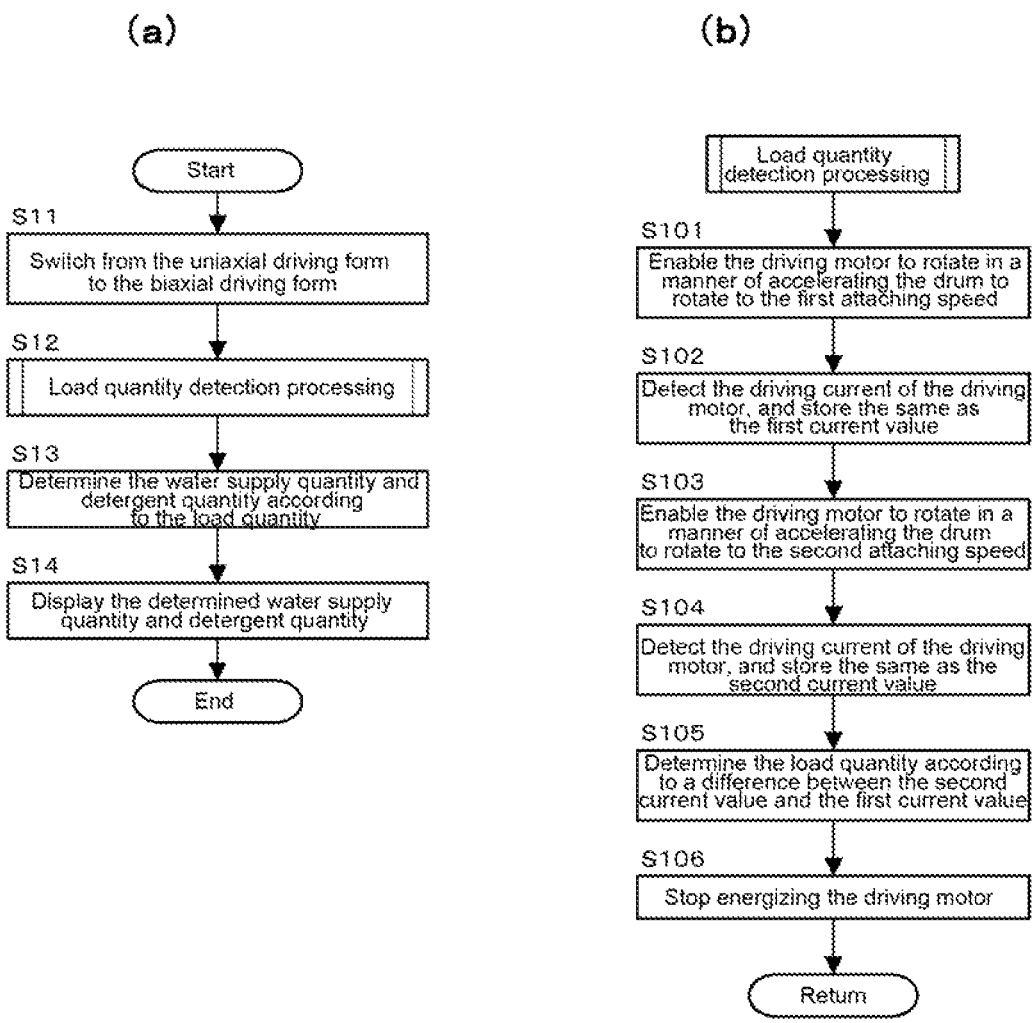
FIGS. 10(a) and 10(b) are flow charts illustrating control processing of a water supply quantity and a detergent quantity corresponding to the load quantity of the present embodiment.

FIG. 10 is a flow chart illustrating control processing of a water supply quantity and a detergent quantity corresponding to the load quantity. FIG. 10(a) is a flow chart illustrating main control processing, and FIG. 10(b) is a flow chart illustrating load quantity detection processing.

The control processing in FIG. 10 is started when the washing operation is started. At the beginning of starting washing operation, the driving form of the driving part 30 is switched to the uniaxial driving form.

By referring to FIG. 10(a), the control part 801 firstly enables the actuator 751 to work such that the clutch body 720 moves towards the side of the wing belt wheel 510, and the driving form of the driving part 30 is switched from the uniaxial driving form to the biaxial driving form (S11). Then, the control part 801 carries out the load quantity detection processing shown in FIG. 10(b) (S12).

By referring to FIG. 10(b), the control part 801 enables the driving motor 100 to rotate unidirectionally in a manner of enabling the drum 22 to unidirectionally rotate to the first attaching speed (S101). The first attaching speed refers to the rotating speed that the centrifugal force acting on washings is larger than the gravity of the washings and washings are attached to the inner circumferential surface of the drum 22. For example, when the inside diameter of the drum 22 is about 520 mm, the first attaching speed is set as 65 rpm. In a process that the rotating speed of the drum 22 is increased to the first attaching speed, washings are attached to the inner circumferential surface of the drum 22 in a state of roughly dispersing. At this time, the rotating body 24 is accelerated to rotate in a way faster than that of the drum 22.

When the drum 22 is accelerated to rotate to the first attaching speed, the driving current flowing to the driving motor 100 is detected by the control part 801 through the current detecting part 805, and is stored as the first current value in the storage part 802 (S102). The first current value is a value of the rotating load correspondingly applied to both the drum 22 and the rotating body 24.

Next, the control part 801 increases the rotating speed of the driving motor 100 to enable the driving motor 100 to rotate in a manner of enabling the drum 22 to unidirectionally accelerate to rotate to the second attaching speed which is higher than the first attaching speed (S103). For example, when the inside diameter of the drum 22 is about 520 mm, the second attaching speed is set as 165 rpm.

Then, the driving current flowing to the driving motor 100 is also detected by the control part 801 through the current detecting part 805 when the drum 22 is accelerated to rotate to the second attaching speed, and is stored as the second current value in the storage part 802 (S104). The second current value is a value of the rotating load correspondingly applied to both the drum 22 and the rotating body 24.

The control part 801 obtains the difference between the second current value and the first current value stored in the storage part 802, and determines the load quantity by referring to the load quantity table 802a according to the obtained difference (S105). Then, the control part 801 ends the load quantity detection processing after stopping energizing the driving motor 100 to stop the drum 22 (S106).

By returning to FIG. 10(a), the control part 801 determines the water supply quantity and the detergent quantity by referring to the water supply table 802b and the detergent quantity table 802c respectively based on the determined load quantity (S13). Then, the control part 801 displays the determined water supply quantity on the water supply quantity display part 806c, and displays the determined detergent quantity on the detergent quantity display part 806d (S14). Then, the control part 801 ends the control processing in FIG. 10.

The user confirms the detergent quantity displayed by the detergent quantity display part 806d, and puts the quantity of detergent into the detergent box 50. Then, the control part 801 only supplies the determined water supply quantity of water to the outer tank 20 in the washing process and the rinsing process.

Effect of the Embodiment

By adopting the present embodiment, since the load quantity is detected according to the rotating load applied to the drum 22 and the rotating load applied to the rotating body 24 rotating relative to the drum 22 when the load quantity is detected and after the driving part 30 is operated in the biaxial driving form, a reduced part can also be complemented by increasing the variation of the rotating load of the rotating body 24 even if the variation of the rotating load of the drum 22 is reduced relative to the increment of the load quantity in the areas with the large load quantity in the detection range of the load quantity. Therefore, the reduction of the detection precision of the load quantity in the areas with the large load quantity can be prevented, and the detection precision of the overall load quantity can be enhanced.

Further, according to the present embodiment, since the rotating load applied to the drum 22 and the rotating load applied to the rotating body 24 are detected according to the size of the driving current of the driving motor 100 for driving the drum 22 and the rotating body 24, two rotating loads can be easily integrated for detection.

Further, the driving current value of the driving motor 100 may have a deviation due to voltage change of an external commercial power supply and a manufacturing error of products. Through the present embodiment, since the solution is designed to acquire the difference between the magnitudes of the driving current when the drum is accelerated to rotate to two attaching speeds, and the load quantity is detected according to the difference, the deviation generated by the voltage change and the manufacturing error can be offset and the detection precision of the load quantity can be further improved.

Embodiments of the present disclosure are described above. However, the present disclosure is not limited to any of the above embodiments. In addition, embodiments of the present disclosure can also be subjected to various changes in addition to the above.

For example, in the above embodiment, the load quantity is detected according to the difference between the second current value detected when the drum is accelerated to rotate to the second attaching speed and the first current value detected when the drum is accelerated to rotate to the first attaching speed. However, the load quantity can also be detected according to one current value detected when the drum is accelerated to rotate to one attaching speed.

Further, in the above embodiment, the drum 22 rotates by using the inclination shaft inclining relative to the horizontal direction as the center; however, the drum 22 of the drum washing machine 1 can also be a structure which rotates by using the horizontal shaft as the center.

Further, the drum washing machine 1 of the above embodiment does not have the drying function. However, the present disclosure is also applicable to the drum washing machine with the drying function, i.e., a drum washing and drying machine.

In addition, embodiments of the present disclosure can be subjected to various changes within the scope of a technical idea shown in claims.

A LIST OF REFERENCE NUMERALS

10: Shell; 20: Outer tank; 22: Drum; 24: Rotating body; 24a: Protruding part; 30: Driving part; 100: Driving motor; 801: Control part; 805: Current detecting part; 807: Motor driving part.

What is claimed is:
1. A drum washing machine comprising:
an outer tank, configured in a shell;
a drum, configured in the outer tank and capable of rotating by using a horizontal axis or an inclination axis inclining relative to a horizontal direction as a center;
a rotating body, configured at a rear part of the drum and provided with a protruding part in contact with washings on a surface of the rotating body;
a driving part, capable of operating in a first driving form and a second driving form, wherein the first driving form is a driving form that enables the drum and the rotating body to rotate at different rotating speeds, and the second driving form is a driving form that enables the drum and the rotating body to integrally rotate at a same rotating speed, wherein the driving part comprises a driving motor configured to generate a torque for enabling the drum and the rotating body to rotate;
a motor driving part, configured to provide a driving current to the driving motor;
a current detecting part, configured to detect the driving current; and
a control part configured to:
drive the driving part to operate in the first driving form, so that the drum accelerates to rotate to a first attaching speed at which washings can be attached to an inner circumferential surface of the drum and then accelerates to rotate to a second attaching speed higher than the first attaching speed; and
detect the load quantity based on a difference between a size of the driving current detected by the current detecting part when the drum accelerates to rotate to the second attaching speed and a size of the driving current detected by the current detecting part when the drum accelerates to rotate to the first attaching speed.

* * * * *